(12) United States Patent
Minamisawa

(10) Patent No.: US 7,346,708 B2
(45) Date of Patent: Mar. 18, 2008

(54) ACCESS POINT HIGH-SPEED CONNECTING METHOD USING PRESENCE SERVICE

(75) Inventor: Takeaki Minamisawa, Tokyo (JP)

(73) Assignee: NEC Corporation, Tokyo (JP)

( * ) Notice: Subject to any disclaimer, the term of this patent is extended or adjusted under 35 U.S.C. 154(b) by 835 days.

(21) Appl. No.: 10/848,390

(22) Filed: May 19, 2004

(65) Prior Publication Data
US 2004/0249977 A1 Dec. 9, 2004

(30) Foreign Application Priority Data
May 20, 2003 (JP) .............................. 2003-141918

(51) Int. Cl.
G06F 15/16 (2006.01)

(52) U.S. Cl. ...................... 709/250; 709/204; 709/223; 709/237; 370/401; 455/414.1

(58) Field of Classification Search ........ 709/202–205, 709/219, 223–224, 230, 237, 245, 250; 370/312–313, 370/338, 461, 400–401; 455/414.1, 432–434
See application file for complete search history.

(56) References Cited

U.S. PATENT DOCUMENTS 7,145,902 B2 * 12/2006 Schindler et al. ........... 370/401
7,200,362 B2 * 4/2007 Muratsu ................... 455/414.1
2004/0068574 A1 * 4/2004 Costa Requena et al. ... 709/230

FOREIGN PATENT DOCUMENTS

JP 2002-27531 A 1/2002
JP 2003-37860 A 2/2003

* cited by examiner

Primary Examiner—Bharat Barot
(74) Attorney, Agent, or Firm—Sughrue Mion, PLLC

(57) ABSTRACT

In an access point high-speed connecting method using presence service, when a wireless terminal for presence service moves into a service area of a wireless LAN or is powered, the terminal can be connected to an access point of the network at a high speed. When a presence subscription request is received from a first wireless terminal as a request source, a second wireless terminal registers a group ID and a user ID to a data storage. At connection to an access point, the second terminal determines the request source, i.e., a transmission destination according to information of access points to which a connection is already once established. The second terminal creates presence information including new network interface support information, i.e., an MAC address, a service set ID, and a group ID of the access point and transmits the presence information. Even when the first terminal receives the information and moves to an access point in the stealth mode, the first wireless terminal can be smoothly connected to an access point using the information thus received.

15 Claims, 13 Drawing Sheets

FIG.3

SUBSCRIBE sip:suzuki@aa.com:5060 SIP/2.0
Via: SIP/2.0/UDP 131.201.30.224:5060:branch=z9hG4bK-12c0858b-107096.187
From:山田<sip:suzuki@aa.com>:tag=56d27977
To:<sip:suzuki@aa.com>
Call-ID:5c4e7172@suzuki.131.201.30.237
CSeq:1 SUBSCRIBE
Contact:<sip:yamada@131.201.30.224>
Expires:3600
Event:presence
Content-Length:0
User-Agent:group=AA-Corp:group=BB-Hotspot

FIG.4

```
NOTIFY sip:yamada@131.201.30.224 SIP/2.0
Via:SIP/2.0/UDP 131.201.31.174:6060:branch=z9hG4bK-4b86d001-073303.101
From:<sip:suzuki@aa.com>:tag=63574dc9
To:<sip:yamada@aa.com>:tag=56d27977
Call-ID:5c4e7172@suzuki.131.201.30.237
CSeq:1 NOTIFY
Contact:<sip:-@131.201.31.174:5060>
Subscription-State:active:expires=3600
Event:presence
Content-Type:application/cpim-pidf+xml
Content-Length:389

<?xml version="1.0"?>
<presence xmlns="urn:ietf:params:cpim-presence">
        <tup | e id="mobile-phone">
                <status><value>online</value></status>
                <contact priority="1">sip:suzuki@aa.com</contact>
        </tup | e>
        <tup | e id="wlan-support">
                <status><value>online</value></status>
                <contact></contact>
                <note>
                        <group>AA-Corp</group>
                        <ssid>aa-office-oosaka</ssid>
                        <mac>0007300CE034</mac>
                </note>
        </tup | e>
</presence>
```

FIG.5

| GROUP ID |
|---|
| AA-Corp |
| BB-Hotspot |

FIG.6

| USER ID | GROUP ID |
|---|---|
| sasaki@bb.com | BB-Hotspot |
| — | — |
| — | — |

FIG.7

| SETTING ID | SSID | AUTHENTICATION INFORMATION | GROUP ID |
|---|---|---|---|
| 01 | aa-office-tokyo | aaaaa | AA-Corp |
| 02 | aa-office-oosaka | bbbbb | AA-Corp |
| 03 | bb-hotspot-tokyo | ccccc | BB-Hotspot |

FIG.8

| MAC ADDRESS | SETTING ID | STORAGE TIME | USE TIME |
|---|---|---|---|
| 000AE001350B | 03 | 2002/12/24 23:00 | 2002/12/26 23:00 |
| — | — | — | — |
| — | — | — | — |
| — | — | — | — |

FIG.9

| GROUP ID |
|---|
| AA-Corp |
| CC-Hotspot |

FIG.10

| USER ID | GROUP ID |
|---|---|
| — | — |
| — | — |
| — | — |

FIG.11

| SETTING ID | SSID | AUTHENTICATION INFORMATION | GROUP ID |
|---|---|---|---|
| 01 | aa-office-tokyo | aaaaa | AA-Corp |
| 02 | aa-office-oosaka | bbbbb | AA-Corp |
| 03 | cc-hotspot-tokyo | ddddd | CC-Hotspot |

FIG.12

| MAC ADDRESS | SETTING ID | STORAGE TIME | USE TIME |
|---|---|---|---|
| 00061007BA01 | 03 | 2003/2/16 12:31 | 2003/2/16 12:31 |
| 0007300CE034 | 02 | 2003/3/2 13:05 | 2003/3/19 10:00 |
| — | — | — | — |
| — | — | — | — |

FIG.13

| MAC ADDRESS | SETTING ID | STORAGE TIME | USE TIME |
|---|---|---|---|
| 000AE001350B | 03 | 2002/12/26 23:00 | 2002/12/26 23:00 |
| 0007300E0DA3 | 01 | 2003/3/2 13:05 | 2003/3/19 10:00 |
| — | — | — | — |
| — | — | — | — |

FIG.14

| USER ID | GROUP ID |
|---|---|
| yamada@aa.com | AA-Corp |
| — | — |
| — | — |

FIG.15

| MAC ADDRESS | SETTING ID | STORAGE TIME | USE TIME |
|---|---|---|---|
| 000AE001350B | 03 | 2002/12/26 23:00 | 2002/12/26 23:00 |
| 0007300E0DA3 | 01 | 2003/3/2 13:05 | 2003/3/19 10:00 |
| 0007300CE034 | 02 | 2003/3/2 14:15 | — |
| — | — | — | — |

FIG.16

| MAC ADDRESS | SETTING ID | STORAGE TIME | USE TIME |
|---|---|---|---|
| 00061007BA01 | 03 | 2003/2/16 12:31 | 2003/2/16 12:31 |
| 0007300CE034 | 02 | 2003/3/2 13:05 | 2003/3/19 10:00 |
| 0007300A0B33 | 02 | 2003/3/3 9:02 | 2003/3/3 9:02 |
| — | — | — | — |

FIG.17

| MAC ADDRESS | SETTING ID | STORAGE TIME | USE TIME |
|---|---|---|---|
| 000AE001350B | 03 | 2002/12/26 23:00 | 2002/12/26 23:00 |
| 0007300E0DA3 | 01 | 2003/3/2 13:05 | 2003/3/19 10:00 |
| 0007300CE034 | 02 | 2003/3/2 14:15 | — |
| 0007300A0B33 | 02 | 2003/3/3 9:03 | — |

FIG.18

```
NOTIFY sip:yamada@131.201.30.224 SIP/2.0
Via:SIP/2.0/UDP 131.201.31.174:6060:branch=z9hG4bK-4b86d001-073303.101
From:<sip:suzuki@aa.com>:tag=63574dc9
To:<sip:yamada@aa.com>:tag=56d27977
Call-ID:5c4e7172@suzuki.131.201.30.237
CSeq:1 NOTIFY
Contact:<sip:-@131.201.31.174:5060>
Subscription-State:active:expires=3600
Event:presence
Content-Type:application/cpim-pidf+xml
Content-Length:389

<?xml version="1.0"?>
<presence xmlns="urn:ietf:params:cpim-presence">
        <tuple id="mobile-phone">
                <status><value>online</value></status>
                <contact priority="1">sip:suzuki@aa.com</contact>
        </tuple>
        <tuple id="wlan-support">
                <status><value>online</value></status>
                <contact></contact>
                <note>
                    <move-before>
                        <group>AA-Corp</group>
                        <ssid>aa-office-oosaka</ssid>
                    </move-before>
                    <move-after>
                        <group>AA-Corp</group>
                        <ssid>aa-office-oosaka2</ssid>
                    </move-after>
                    <move-time>73</move-time>
                </note>
        </tuple>
</presence>
```

FIG.19

| SETTING ID BEFORE HANDOVER | SETTING ID AFTER HANDOVER | HANDOVER TIME(S) | STORAGE TIME | USE TIME |
|---|---|---|---|---|
| 01 | 03 | 73 | 2002/12/24 23:00 | 2002/12/26 23:00 |
| 01 | 02 | 14400 | 2003/1/12 10:07 | — |
| — | — | — | — | — |
| — | — | — | — | — |

FIG.20

```
NOTIFY sip:yamada@131.201.30.224 SIP/2.0
Via:SIP/2.0/UDP 131.201.31.174:6060:branch=z9hG4bK-4b86d001-073303.101
From:<sip:suzuki@aa.com>:tag=63574dc9
To:<sip:yamada@aa.com>:tag=56d27977
Call-ID:5c4e7172@suzuki.131.201.30.237
CSeq:1 NOTIFY
Contact:<sip:-@131.201.31.174:5060>
Subscription-State:active:expires=3600
Event:presence
Content-Type:application/cpim-pidf+xml
Content-Length:389

<?xml version="1.0"?>
<presence xmlns="urn:ietf:params:cpim-presence">
          <tuple id="mobile-phone">
                    <status><value>online</value></status>
                    <contact priority="1">sip:suzuki@aa.com</contact>
          </tuple>
          <tuple id="wlan-support">
                    <status><value>online</value></status>
                    <contact></contact>
                    <note>
                              <group>AA-Corp</group>
                              <ssid>aa-office-oosaka</ssid>
                              <latitude>35:40:1</latitude>
                              <longitude>139:27:31</longitude>
                    </note>
          </tuple>
</presence>
```

FIG.21

| ACCESS POINT POSITION | | MAC ADDRESS | SETTING ID | STORAGE TIME | USE TIME |
| --- | --- | --- | --- | --- | --- |
| LATITUDE | LONGITUDE | | | | |
| 35:40:01 | 139:27:31 | 000AE001350B | 03 | 2002/12/24 23:00 | 2002/12/26 23:00 |
| — | — | — | — | — | — |
| — | — | — | — | — | — |

ACCESS POINT HIGH-SPEED CONNECTING METHOD USING PRESENCE SERVICE

BACKGROUND OF THE INVENTION

1. Field of the Invention

The present invention relates to an access point high-speed connecting method using presence service, and in particular, to an access point high-speed connecting method using presence service in which when a wireless terminal device or terminal coping with a presence service moves into a service area of a wireless local-area network (LAN) or is powered, the terminal can be connected to an access point of the wireless LAN at a high speed.

2. Description of the Prior Art

Presence services and instant messages have been increasingly utilized on the internet today and are expected to be employed by various devices such as a personal computer and various devices including a portable terminal in the future. In this situation, for example, the standardizing organization "Internet Engineering Task Force (IETF)" has standardized the presence services and the instant messages.

In the stage of the technique, there has been generally used a stealth mode for an access point. In the mode, only when a wireless terminal accesses an access point using correct setting information (a service set identification or identifier (SSID) for the wireless LAN), the access point returns a reply to the terminal. That is, to guarantee security, the access point does not notify information regarding a connection or an interface.

When a wireless terminal including a short-distance wireless device associated with, for example, a wireless LAN standardized by the standardizing organization, the institute of electric and electronic engineers (IEEE) desires to establish a connection to an access point, it is required for the terminal to operate as follows. The terminal examines by a program each of a large number of setting information items stored in the terminal to resultantly establish a connection to an access point. Or, the terminal requests the user to select necessary items from the setting information items. The user selects the items operating a user interface such as a button so that the terminal establishes a connection to an access point.

The former case has a problem that the mean connection time between the wireless terminal and the access point becomes longer in proportion to the number of setting information items. The latter case is accompanied by a problem that the user is required to operate the terminal each time the position of the terminal is changed and hence usability is deteriorated for the user.

These problems become factors to prevent smooth communication in real-time services. Some known prior arts attempt to solve these adverse factors as below.

For example, according to JP 2002-27531A, a terminal stores therein a failure list of base station information obtained at failure of registration of communication with base stations to effectively establish a connection to base station. Moreover, according to JP 2003-37860A, network addresses to which a connection was once established in the past are stored. In a case in which a plurality of base stations exist, a base station at a network address used before takes precedence and is selected to efficiently establish a connection to the base station when a terminal is moved.

However, in these articles, respective terminals are independent to each other. Only such a terminal having stored learned information can efficiently establish a connection as above. Therefore, it takes a long period of time to efficiently operate the entire system.

SUMMARY OF THE INVENTION

It is therefore an object of the present invention to provide an access point high-speed connecting method using presence service wherein information of access points to which a connection is once established is sent together with presence information only to users possibly employing the access points. Therefore, even in an environment in which the access points are in the stealth mode, many wireless terminals can be smoothly connected to associated access points.

In accordance with the present invention, there is provided an access point high-speed connecting method using presence service in which a first information terminal including a presentity for delivering presence information onto a network, a watcher for transmitting to a second information terminal a presence subscription information to request presence information of the second information terminal, receiving presence information delivered from the network, and displaying the presence information; and a data storage unit for storing various information regarding presence service is connected to a predetermined access point, which is included in the network and which can be set to a stealth mode, and is thereby connected to a second information terminal and thereby provides and communicates presence information to and with the second information terminal. The data storage unit is used by the first information terminal to store therein a group identifier to identify a group representing objects connectible to the second information terminal and interface support information for the first information terminal to be connected to an access point in the stealth mode. The method includes a group identifier adding step of adding by the first information terminal, when it is desired to obtain presence of the second information terminal, the group identifier to the presence subscription request to be transmitted from the watcher of the first information terminal to the second information terminal and a first interface support information transmitting step of notifying by the second information terminal, when the second information terminal receives the presence subscription request after the group identifier adding step and transmits presence information through a connection to an access point to the first information terminal, the interface support information by the presence service only to information terminals belonging to a group of the second information terminal.

BRIEF DESCRIPTION OF THE DRAWINGS

The objects and features of the present invention will become more apparent from the consideration of the following detailed description taken in conjunction with the accompanying drawings in which:

FIG. 3 is a diagram showing an example of a protocol for a presence subscription request;

FIG. 4 is a diagram showing an example of a protocol for presence information;

FIG. 5 is a diagram showing an example of structure (initial data) of a table stored in a data storage 3 of a wireless terminal 1 in the first embodiment;

FIG. 6 is a diagram showing an example of structure (initial data) of a table stored in a data storage 3 of a wireless terminal 1 in the first embodiment;

FIG. 7 is a diagram showing an example of structure (initial data) of a table stored in a data storage 3 of a wireless terminal 1 in the first embodiment;

FIG. 8 is a diagram showing an example of structure (initial data) of a table stored in a data storage 3 of a wireless terminal 1 in the first embodiment;

FIG. 9 is a diagram showing an example of structure (initial data) of a table stored in a data storage 3 of a wireless terminal 2 in the first embodiment;

FIG. 10 is a diagram showing an example of structure (initial data) of a table stored in a data storage 3 of a wireless terminal 2 in the first embodiment;

FIG. 11 is a diagram showing an example of structure (initial data) of a table stored in a data storage 3 of a wireless terminal 2 in the first embodiment;

FIG. 12 is a diagram showing an example of structure (initial data) of a table stored in a data storage 3 of a wireless terminal 2 in the first embodiment;

FIG. 13 is a diagram showing the table of FIG. 8 after processing step S1 of FIG. 2;

FIG. 14 is a diagram showing the table of FIG. 10 after processing step S3 of FIG. 2;

FIG. 15 is a diagram showing the table of FIG. 13 after processing step S5 of FIG. 2;

FIG. 16 is a diagram showing the table of FIG. 12 after processing step S6 of FIG. 2;

FIG. 17 is a diagram showing the table of FIG. 15 after processing step S8 of FIG. 2;

FIG. 18 is a diagram showing an example of a protocol for presence information in a second embodiment;

FIG. 19 is a diagram showing an example of structure of a table stored in a data storage 3 of a wireless terminal in the second embodiment;

FIG. 20 is a diagram showing an example of a protocol for presence information in a third embodiment; and FIG. 21 is a diagram showing an example of structure of a table stored in a data storage 3 of a wireless terminal in the third embodiment.

DESCRIPTION OF THE EMBODIMENTS

Figure 1:
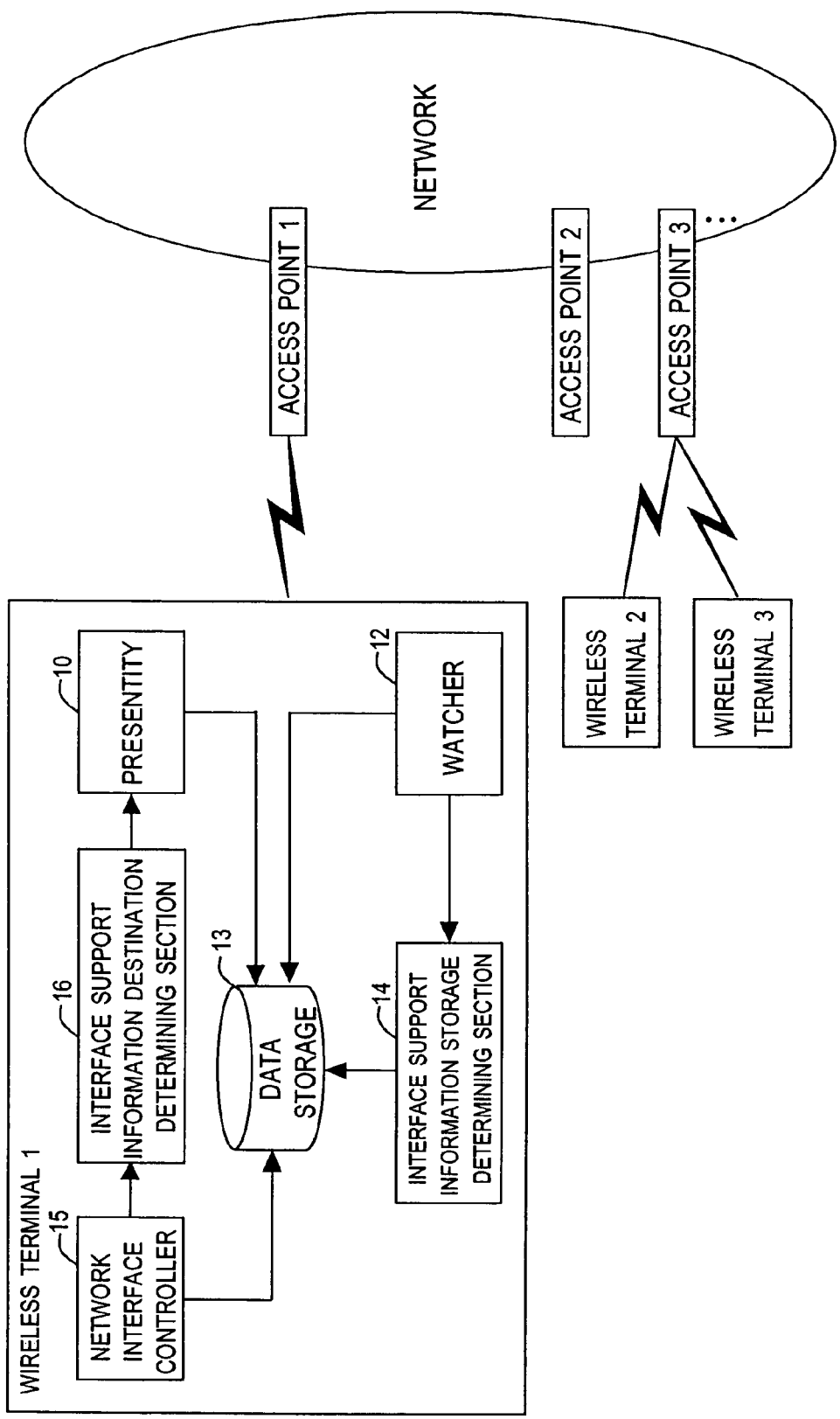
FIG. 1 is a schematic block diagram showing a configuration of a first embodiment of a presence service system.

Referring now to the drawings, description will be given of an embodiment in accordance with the present invention.

This embodiment in accordance with one aspect of the present invention relates to an access point high-speed connecting method using presence service in which when a wireless terminal device or terminal coping with a presence service moves into a service area of a wireless LAN or is powered, the terminal can be connected to an access point of the wireless LAN at a high speed.

The presence service is employed to achieve smooth communication by delivering a state of a user of a terminal such as presence or absence of the user's terminal (user) and/or an online or offline state of the terminal to other terminals.

In this situation, to strengthen security in a communication scheme such as a wireless LAN, it is recommended to set a stealth mode in which a service set identifier (SSID) of an access point is not notified. However, when the access point is set to the stealth mode, it is required for a wireless terminal to examine each service set identifier registered to the terminal for a connection to each access point. This requires a long period of time for the terminal to be connected to an access point.

Therefore, even when the wireless terminal is moved into a service area of the wireless LAN, the terminal cannot be immediately connected to an access point. As a result, the terminal cannot conduct smooth communication.

The present embodiment provides a method wherein information of access points to which a connection is once established is sent together with presence information only to users possibly adopting the access points such that even in an environment in which the access points are in the stealth mode, many wireless terminals can be smoothly connected to associated access points.

However, the constituent components, kinds, and combinations described in the embodiment are adopted only by way of illustration unless otherwise notified and hence do not restrict the scope and spirit of the present invention.

Configuration of First Embodiment

FIG. 1 shows a configuration of the first embodiment of a communication system.

The system includes a large number of wireless LAN access points 1 to 3 which are disposed on the internet or a network of an intra-network and which have mutually different setting information items, and many wireless terminals 1 to 3 capable of freely moving between the access points 1 to 3 (handover). However, the present invention is not limited to number of the access point(s) and wireless terminals.

When network connected to the terminals 1 to 3 cannot be known or determined (eg. for public uses or the like), and hence it is also possible to install a position registering server on the network. If they are connected to a known network, it is also possible to make a search for other wireless terminals through a broadcasting operation. Each of the terminals 1 to three has an input device (input key or the like).

Next, the configuration of the wireless terminal will be described. The wireless terminals 1 to 3 are equal in the block configuration to each other, and the same reference numerals are assigned to the same constituent components.

The terminal includes a presentity 11 to provide presence, a watcher 12, a data storage 13, a connection or interface support information storage judge section 14, a network interface controller 15, and an interface support information destination determining section 16. The presentity 1 has a function to deliver presence information onto a network according to a state of a connection to an access point or in response to an indication from the user.

The watcher 12 sends a presence subscription request to a presentity 11 of another wireless terminal for presence information and receives presence information delivered from a network to display the information to the user.

The presentity 11 keeps a list of users having issued a request for presence information thereto, and the watcher 12 holds a list of users having transmitted a presence subscription request thereto.

The data storage 13 is a module to generally store data in a wireless terminal and includes a flash memory and/or a hard disk. The storage 13 stores interface support information such as setting information for access points, user group information, and setting information for each media access control (MAC) address.

The interface support information storage judge section 14 determines whether or not interface support information to be set to presence information received by the watcher 12 is to be stored in the data storage 13.

The network interface controller 15 controls interface between the terminal and an access point and notifies the result of the interface control operation to the interface support information destination determining section 16.

The section 6 detects a wireless terminal using a service set identifier equal to that of an access point to which the pertinent terminal is connected and notifies the terminal to the presentity 1.

Referring now to FIGS. 5 to 8, description will be given of a layout of tables held in the data storage 3.

FIG. 5 shows a table to store a group identifier for the wireless terminal to identify a group to which the terminal is connectible. The group identifier indicates, for example, a company name or a hot spot name.

FIG. 6 shows a table to store a group identifier for another user to identify a connectible group and a user identifier to identify the user.

FIG. 7 shows a table to store a service set identifier necessary for the wireless terminal and an access point to establish a connection for communication therebetween, authentication information such as a wired equivalent privacy (WEP) key and/or a password, and a group identifier to which the access point belongs.

FIG. 8 shows a table to store interface support information for the wireless terminal and an access point to establish a connection or interface for communication therebetween. Specifically, the table stores a media access control (MAC) address, a setting identifier as a link to the table of FIG. 7 for each MAC address, a data storing time for each field, and a time for use of the stored data.

Operation of Embodiment 1

Figure 2:
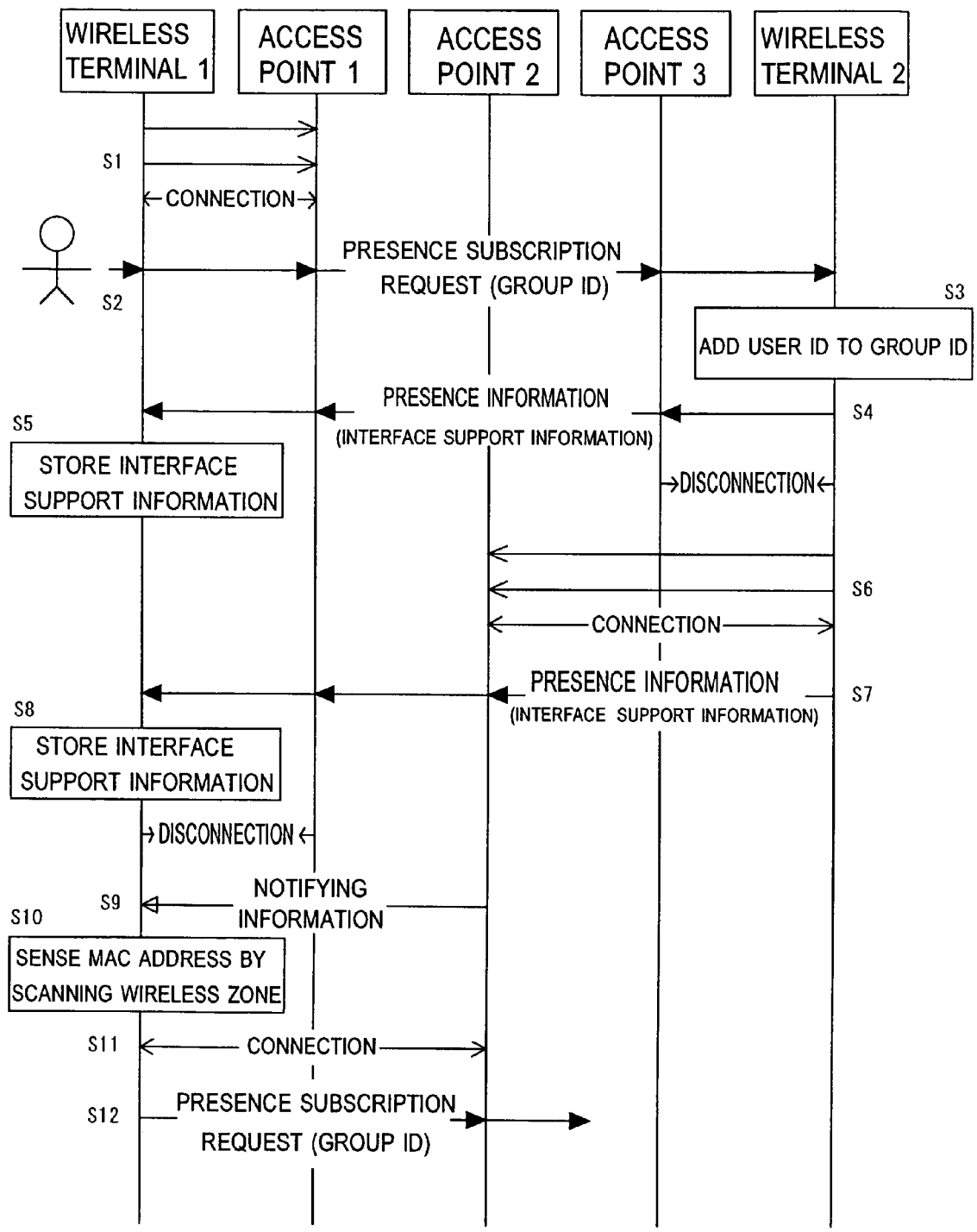
FIG. 2 is a flowchart showing a sequence of operation in the first embodiment.

Next, operation of the first embodiment will be described by referring to the system configuration of FIG. 1, the operation sequence of FIG. 2, and table layouts of FIGS. 5 to 17.

FIGS. 5 to 8 show initial data stored in the data storage 13 of the wireless terminal 1 and FIGS. 9 to 12 show initial data held in the data storage 13 of the wireless terminal 2.

First, the terminal 1 tries to establish a connection to an access point 1 in the neighborhood thereof. Concretely, the terminal 1 attempts the operation by setting by the network interface controller 5 each service set identifier and associated authentication information of FIG. 7 to a wireless LAN device (S1).

If the connection is established, the controller 5 stores a setting identifier of FIG. 7 used for the connection, a storage time, and a use time, i.e., a time of a connection to the access point 1 in the table of FIG. 8 using an MAC address as a main key. The table of FIG. 8 is changed to FIG. 13 as a result.

When the user of the terminal 1 indicates the watcher 12 to display presence information of the terminal 2, the watcher 12 accesses the table of FIG. 5 to obtain therefrom all group identifiers associated with the terminal 1 and then sends a presence subscription request including the group identifiers to the terminal 2 (S2).

FIG. 3 shows a protocol example of the presence subscription request. In the example, a tag "User-Agent" to generally store a name and a version of software is used to specify the group identifiers as underscored in FIG. 3.

Having received the presence subscription request, the presentity 1 of the terminal 2 obtains the group identifiers from the request. For the groups existing in FIG. 9 of the terminal 2, the presentity 1 stores a user identifier and a group identifier of a partner in the table of FIG. 10 (S3). For any group identifier not existing in FIG. 9, the presentity 1 does not store any item in FIG. 10. As a result, the table of FIG. 10 is changed to the table shown in FIG. 14.

Using the group ID notified from the terminal 1 as a search or retrieval key, the presentity obtains a setting identifier of FIG. 11. Using the setting identifier as a search key, the presentity 1 detects an MAC address in FIG. 12.

In the example, the group identifiers received from the wireless terminal 1 are "AA-Corp" and "BB-Hotspot", and hence the setting identifiers "01" and "02" are detected from FIG. 11. Using the setting identifiers, an MAC address of "0007300CE034" is obtained from FIG. 12. The presentity 1 then sends presence information including a user state such as "present" or "absent", each detected MAC address and an associated service set identifier (SSID) as well as an associated group identifier to the wireless terminal 1 (S4). FIG. 4 shows an example of a protocol for the presence information. Data is specified in an extensible markup language (XML) format indicated by an underline in this example.

When the presence information is received, the watcher 2 of the terminal 1 extracts therefrom a group identifier, a service set identifier (SSID), and an MAC address as interface support information and notifies the information to the interface support information storage judge section 4.

The judge section 4 stores an MAC address having a group identifier and a service set identifier as those of FIG. 7 (S5). The table of FIG. 13 is changed to that of FIG. 15 as a result. However, if the number of interface support information items is equal to a predetermined maximum value, a storage area is reserved in the table of FIG. 13 as follows. A record having an oldest use time is deleted from FIG. 13. If there exist records not used at all, one of the records which has an oldest storage time is deleted from FIG. 13.

When the terminal 2 is moved (handover) to be connected by the interface controller 5 to an access point 2 (S6), the terminal 2 stores like the terminal 1 the setting identifier of FIG. 11 used for the connection, a storage time, and a use time including a time of a connection to the access point 1 and then notifies an MAC address of the access point 2 currently in contact with the terminal 2 to the destination determining section 6. As a result of the operation, the contents of FIG. 12 are changed to those of FIG. 16.

When the MAC address is notified, the determining unit 6 obtains a setting identifier of FIG. 16 using the MAC address as a search key and then detects a group ID of FIG. 11 employing the setting identifier as a retrieval key. Finally, the unit 6 attains a user identifier of FIG. 14 by use of the group identifier as a search key. That is, the unit 6 can obtain a user ID belonging to the group associated with the access point 2 currently being connected to the terminal 2. Thereafter, the destination determining section 6 notifies the user identifier, the group identifier, and the MAC address to the presentity 1.

For the user identifier transferred from the determining section 6, the presentity 1 creates presence information including the user status such as presence or absence and interface support information such as the group identifier, the service set identifier, and the MAC address and transmits the presence information to the terminal 1 (S7). If there exist a plurality of sets each including a group identifier, a service set identifier, and an MAC address, the presentity 1 stores all sets of the information items in the presence information. For the users who have sent the presence subscription request and whose user identifications are other than those notified from the determining section 6, only the user status is transmitted as before.

If the presence information is received and the information includes the interface support information, the watcher 2 of the terminal 1 extracts the interface support information therefrom and sends the information to the storage judge unit 4. The judge section 4 conducts a retrieval through FIG. 7 using the service set identifier and the MAC address as a main key to obtain a setting identifier of FIG. 7 and stores the setting identifier in FIG. 15 adopting the MAC address as a main key (S8). Resultantly, the contents of FIG. 15 are changed to those of FIG. 17.

Next, the terminal 1 moves from the access point 1 to the access point 2. Even if the access point 2 is in the stealth mode, the access point 2 notifies an MAC address for a wireless communication range or zone (S9). The network interface controller 5 of the terminal 1 scans the wireless communication zone to sense an MAC address of the access point 2 (S10).

If the detected MAC address has already been registered to the table of FIG. 17, the terminal 1 can be directly connected to the access point 2 using an service set identifier and authentication information corresponding to the MAC address (S11).

When the user of the terminal 1 desires to display presence information of the terminal 2 or any other wireless terminal, the user issues an indication to the watcher 2 as in the operation of S2. The watcher 2 reads from the table of FIG. 5 all group identifiers to which the terminal 1 belongs and then transmits a presence subscription request including each of the group identifiers to the terminal 2 or any other wireless terminal described above (S12).

Second Embodiment

In the first embodiment, the presence information includes a group identifier, a service set identifier, and an MAC address for transmission. However, in place of the information items, a period of time required for a wireless terminal to move between a plurality of service set identifiers (handover), a group identifier and a service set identifier before handover, and a group identifier and a service set identifier after handover may be adopted.

When the system includes quite a large number of access points to which the terminal is connectible, it is difficult for the terminal to establish a connection to an access point at a high speed by using MAC addresses depending on cases. In such a case, even when each setting information is used for an attempt of establishing a connection as in the prior art, the operation can be carried out adopting the setting information in a descending order of probability for a successful connection.

Assume that, for example, a handover from a service set (SS) identifier 1 to an SS identifier 2 took at least 30 seconds and the SS identifier 1 to an SS identifier 3 took at least one hour in the past. In this situation, when the terminal is disconnected from the SS identifier 1, it is possible to save time for an attempt for an inefficient connection by conducting an attempt of establishing a connection to the SS identifier 2 before the SS identifier 3.

FIG. 18 shows a protocol example of presence information in the operation. The table of FIG. 8 which the terminal saves in the data storage 3 is changed to that shown in FIG. 19.

FIG. 19 stores, in addition to the storage time and the use time of FIG. 8, a setting identifier before handover and a setting identifier after handover to set a link to the table of FIG. 7 as well as a handover time between two access points having mutually different setting identifiers.

It is assumed that the handover time is stored in the table of FIG. 19 regardless of an order of a combination of the setting identifier before handover and the setting identifier after handover.

When storing the handover time in the table of FIG. 19, there may exist a case in which the terminal have already stored a handover time between a group identifier and an SS identifier before handover and a group identifier and an SS identifier after handover which are the same as those associated with the handover time to be stored in FIG. 19. In this situation, only if the handover time is less than that already stored in the terminal, the handover time is stored in the table of the terminal. The handover time is set to presence information to be transmitted.

As a result, many wireless terminals can share minimum handover time values required for handovers between different access points.

Third Embodiment

If the position of a wireless terminal can be detected by the global positioning system (GPS) or any other communicating facility, a connection to an access point can also be established as follows. Information of the position of the access point connected to the terminal is additionally stored in the table of FIG. 8 described in conjunction with the first embodiment and is set to the presence information to be transmitted to other wireless terminals. When the table of FIG. 8 becomes full of data, i.e., when the number of records stored in the table reaches a predetermined maximum value, the interface support information items can be deleted for the access points in an ascending order of probability for a successful connection according to the information of the positions of the access points.

Assume that, for example, the access points used in the past are in the Kanto area of Japan and an access point in the Kansai area of Japan is notified for a connection from another terminal. It is possible in this case that the probability of establishing a connection to the access point is low and hence the interface support information thereof is deleted.

In the operation, the protocol of presence information is, for example, as shown in FIG. 20. The table of FIG. 8 stored in the data storage 3 is changed to that shown in FIG. 21.

The table of FIG. 21 includes, in addition to the items of FIG. 8, positional information items of the access point, i.e., a latitude and a longitude.

As shown before, first aspect of the present invention provides an access point high-speed connecting method using presence service in which a first information terminal including a presentity for delivering presence information onto a network, a watcher for transmitting to a second information terminal a presence subscription information to request presence information of the second information terminal, receiving presence information delivered from the network, and displaying the presence information; and a data storage unit for storing various information regarding presence service is connected to a predetermined access point, which is included in the network and which can be set to a stealth mode, and is thereby connected to a second information terminal and thereby provides and communicates presence information to and with the second information terminal. The data storage unit is used by the first information terminal to store therein a group identifier to identify a group representing objects connectible to the second information terminal and interface support information for the first information terminal to be connected to an access point in the stealth mode. The method includes a group identifier adding step of adding by the first information terminal, when it is desired to obtain presence of the second information terminal, the group identifier to the presence subscription request to be transmitted from the watcher of the first information terminal to the second information terminal and a first interface support information transmitting step of notifying by the second information terminal, when the second information terminal receives the presence subscription request after the group identifier adding step and transmits presence information through a connection to an access point to the first information terminal, the interface support information by the presence service only to information terminals belonging to a group of the second information terminal.

Second aspect of the present invention provides an access point high-speed connecting method using presence service in which a first information terminal including a presentity for delivering presence information onto a network, a watcher for transmitting to a second information terminal a presence subscription information to request presence information of the second information terminal, receiving presence information delivered from the network, and displaying the presence information; and a data storage unit for storing various information regarding presence service is connected to a predetermined access point, which is included in the network and which can be set to a stealth mode, and is thereby connected to a second information terminal and thereby provides and communicates presence information to and with the second information terminal. The data storage unit is used by the first information terminal to store therein a group identifier to identify a group representing objects connectible to the second information terminal and interface support information for the first information terminal to be connected to an access point in the stealth mode. The method includes a group identifier adding step of adding by the first information terminal, when it is desired to obtain presence of the second information terminal, the group identifier to the presence subscription request to be transmitted from the watcher of the first information terminal to the second information terminal and a second interface support information transmitting step of notifying by the second information terminal, when the second information terminal first receives the presence subscription request after the group identifier adding step and transmits first presence information through a connection to an access point to the first information terminal, all interface support information belonging to the group identifier by the presence service to the first information terminal.

Third aspect of the present invention provides an access point high-speed connecting method using presence service in which a first information terminal including a presentity for delivering presence information onto a network, a watcher for transmitting to a second information terminal a presence subscription information to request presence information of the second information terminal, receiving presence information delivered from the network, and displaying the presence information; and a data storage unit for storing various information regarding presence service is connected to a predetermined access point, which is included in the network and which can be set to a stealth mode, and is thereby connected to a second information terminal and thereby provides and communicates presence information to and with the second information terminal. The data storage unit is used by the first information terminal to store therein a group identifier to identify a group representing objects connectible to the second information terminal and interface support information for the first information terminal to be connected to an access point in the stealth mode. The method includes a group identifier adding step of adding by the first information terminal, when it is desired to obtain presence of the second information terminal, the group identifier to the presence subscription request to be transmitted from the watcher of the first information terminal to the second information terminal; a first interface support information transmitting step of notifying by the second information terminal, when the second information terminal receives the presence subscription request after the group identifier adding step and transmits presence information through a connection to an access point to the first information terminal, the interface support information by the presence service only to information terminals belonging to a group of the second information terminal; and a second interface support information transmitting step of notifying by the second information terminal, when the second information terminal first receives the presence subscription request after the group identifier adding step and transmits first presence information through a connection to an access point to the first information terminal, all interface support information belonging to the group identifier by the presence service to the first information terminal.

In the first to third aspects of the present invention, the interface support information includes a media access control (MAC) address, a service set identifier, and a group identifier of the access point. The first information terminal having received the interface support information includes an MAC address detecting step of detecting an MAC address of an access point in the stealth mode by scanning a wireless zone.

In the first to third aspects of the present invention, the interface support information includes a service set identifier of an access point before a handover of the first information terminal, a service set identifier of an access point after a handover thereof, and handover time information representing a period of time required for a handover from the service set identifier of the access point before the handover to the service set identifier of the access point after the handover. The first information terminal having received the interface support information includes a connection destination determining step of referring to the handover time information and thereby establishing a connection to an access point in an ascending order of the period of time required for the handover.

In the first to third aspects of the present invention, the method further includes the step of disposing a position detecting unit for detecting a position of an information terminal and communicating position information of the position. The interface support information includes the position information detected by the position detecting unit. The first information terminal having received the interface support information includes a connection destination deleting step of referring to the position information when the number of lists of the interface support information reaches a maximum registration value of lists in the data storage unit and deleting interface support information of access points in an ascending order of probability of a connection thereof.

According to one aspect of the present invention, connection or interface information of access points for which a connection is once established is set to presence information and is delivered by the presence information. Even when a large number of wireless terminals exist on the internet or an intra-net, performance of establishing a connection to an access point can be increased in the overall system without imposing any particular load on the network.

Moreover, according to one aspect of the present invention, the presence subscription request includes a group identifier. Therefore, even between users receiving a presence service, it is possible to prevent transmission of information of access points having no chance of a connection. This suppresses leakage of information and mitigates load imposed on the network.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An access point high-speed connecting method,
wherein the method is using presence service in which a first information terminal including a presentity for delivering presence information onto a network, a watcher for transmitting to a second information terminal a presence subscription information to request presence information of the second information terminal, receiving presence information delivered from the network, and displaying the presence information; and data storage for storing various information regarding presence service is connected to a predetermined access point, which is included in the network and which can be set to a stealth mode, and is thereby connected to a second information terminal and thereby provides and communicates presence information to and with the second information terminal,
the data storage is used by the first information terminal to store therein a group identifier to identify a group representing objects connectible to the second information terminal and interface support information for the first information terminal to be connected to an access point in the stealth mode, the method, comprising:
a group identifier adding step of adding by the first information terminal, when it is desired to obtain presence of the second information terminal, the group identifier to the presence subscription request to be transmitted from the watcher of the first information terminal to the second information terminal; and
a first interface support information transmitting step of notifying by the second information terminal, when the second information terminal receives the presence subscription request after the group identifier adding step and transmits presence information through a connection to an access point to the first information terminal, the interface support information by the presence service only to information terminals belonging to a group of the second information terminal.

2. An access point high-speed connecting method using presence service in accordance claim 1, wherein the interface support information includes a media control (MAC) address, a service set identifier, and a group identifier of the access point; and
the first information terminal having received the interface support information includes an MAC address detecting step of detecting an MAC address of an access point in the stealth mode by scanning a wireless zone.

3. An access point high-speed connecting method using presence service in accordance with claim 2, further comprising the step of disposing position detecting means for detecting a position of an information terminal and communicating position information of the position, wherein:
the interface support information includes the position information detected by the position detecting means; and
the first information terminal having received the interface support information includes a connection destination deleting step of referring to the position information when the number of lists of the interface support information reaches a maximum registration value of lists in the data storage means and deleting interface support information of access points in an ascending order of probability of a connection thereof.

4. An access point high-speed connecting method using presence service in accordance with claim 1, wherein the interface support information includes a service set identifier of an access point before a handover of the first information terminal, a service set identifier of an access point after a handover thereof, and handover time information representing a period of time required for a handover from the service set identifier of the access point before the handover to the service set identifier of the access point after the handover, and
the first information terminal having received the interface support information includes a connection destination determining step of referring to the handover time information and thereby establishing a connection to an access point in an ascending order of the period of time required for the handover.

5. An access point high-speed connecting method using presence service in accordance with claim 4, further comprising the step of disposing position detecting means for detecting a position of an information terminal and communicating position information of the position, wherein:
the interface support information includes the position information detected by the position detecting means; and
the first information terminal having received the interface support information includes a connection destination deleting step of referring to the position information when the number of lists of the interface support information reaches a maximum registration value of lists in the data storage means and deleting interface support information of access points in an ascending order of probability of a connection thereof.

6. An access point high-speed connecting method, wherein the method is using presence service in which a first information terminal including a presentity for delivering presence information onto a network, a watcher for transmitting to a second information terminal a presence subscription information to request presence information of the second information terminal, receiving presence information delivered from the network, and displaying the presence information; and data storage means for storing various information regarding presence service is connected to a predetermined access point, which is included in the network and which can be set to a stealth mode, and is thereby connected to a second information terminal and thereby provides and communicates presence information to and with the second information terminal, wherein:
the data storage means is used by the first information terminal to store therein a group identifier to identify a group representing objects connectible to the second information terminal and interface support information for the first information terminal to be connected to an access point in the stealth mode, the method, comprising:
a group identifier adding step of adding by the first information terminal, when it is desired to obtain presence of the second information terminal, the group identifier to the presence subscription request to be transmitted from the watcher of the first information terminal to the second information terminal; and a second interface support information transmitting step of notifying by the second information terminal, when the second information terminal first receives the presence subscription request after the group identifier adding step and transmits first presence information through a connection to an access point to the first information terminal, all interface support information belonging to the group identifier by the presence service to the first information terminal.

7. An access point high-speed connecting method using presence service in accordance with claim 6, wherein the interface support information includes a media control (MAC) address, a service set identifier, and a group identifier of the access point; and the first information terminal having received the interface support information includes an MAC address detecting step of detecting an MAC address of an access point in the stealth mode by scanning a wireless zone.

8. An access point high-speed connecting method using presence service in accordance with claim 7, further comprising the step of disposing position detecting means for detecting a position of an information terminal and communicating position information of the position, wherein:

the interface support information includes the position information detected by the position detecting means; and the first information terminal having received the interface support information includes a connection destination deleting step of referring to the position information when the number of lists of the interface support information reaches a maximum registration value of lists in the data storage means and deleting interface support information of access points in an ascending order of probability of a connection thereof.

9. An access point high-speed connecting method using presence service in accordance with claim 2, wherein the interface support information includes a service set identifier of an access point before a handover of the first information terminal, a service set identifier of an access point after a handover thereof, and handover time information representing a period of time required for a handover from the service set identifier of the access point before the handover to the service set identifier of the access point after the handover, and the first information terminal having received the interface support information includes a connection destination determining step of referring to the handover time information and thereby establishing a connection to an access point in an ascending order of the period of time required for the handover.

10. An access point high-speed connecting method using presence service in accordance with claim 9, further comprising the step of disposing position detecting means for detecting a position of an information terminal and communicating position information of the position, wherein:

the interface support information includes the position information detected by the position detecting means; and the first information terminal having received the interface support information includes a connection destination deleting step of referring to the position information when the number of lists of the interface support information reaches a maximum registration value of lists in the data storage means and deleting interface support information of access points in an ascending order of probability of a connection thereof.

11. An access point high-speed connecting method using presence service in which a first information terminal including a presentity for delivering presence information onto a network, a watcher for transmitting to a second information terminal a presence subscription information to request presence information of the second information terminal, receiving presence information delivered from the network, and displaying the presence information; and data storage means for storing various information regarding presence service is connected to a predetermined access point, which is included in the network and which can be set to a stealth mode, and is thereby connected to a second information terminal and thereby provides and communicates presence information to and with the second information terminal, wherein:

the data storage means is used by the first information terminal to store therein a group identifier to identify a group representing objects connectible to the second information terminal and interface support information for the first information terminal to be connected to an access point in the stealth mode, the method, comprising:

a group identifier adding step of adding by the first information terminal, when it is desired to obtain presence of the second information terminal, the group identifier to the presence subscription request to be transmitted from the watcher of the first information terminal to the second information terminal;

a first interface support information transmitting step of notifying by the second information terminal, when the second information terminal receives the presence subscription request after the group identifier adding step and transmits presence information through a connection to an access point to the first information terminal, the interface support information by the presence service only to information terminals belonging to a group of the second information terminal; and a second interface support information transmitting step of notifying by the second information terminal, when the second information terminal first receives the presence subscription request after the group identifier adding step and transmits first presence information through a connection to an access point to the first information terminal, all interface support information belonging to the group identifier by the presence service to the first information terminal.

12. An access point high-speed connecting method using presence service in accordance with claim 11, wherein the interface support information includes a media control (MAC) address, a service set identifier, and a group identifier of the access point; and the first information terminal having received the interface support information includes an MAC address detecting step of detecting an MAC address of an access point in the stealth mode by scanning a wireless zone.

13. An access point high-speed connecting method using presence service in accordance with claim 12, further comprising the step of disposing position detecting means for detecting a position of an information terminal and communicating position information of the position, wherein:

the interface support information includes the position information detected by the position detecting means; and the first information terminal having received the interface support information includes a connection destination deleting step of referring to the position information when the number of lists of the interface support information reaches a maximum registration value of lists in the data storage means and deleting interface support information of access points in an ascending order of probability of a connection thereof.

14. An access point high-speed connecting method using presence service in accordance with claim 11, wherein the interface support information includes a service set identifier of an access point before a handover of the first information terminal, a service set identifier of an access point after a handover thereof, and handover time information representing a period of time required for a handover from the service set identifier of the access point before the handover to the service set identifier of the access point after the handover, and the first information terminal having received the interface support information includes a connection destination determining step of referring to the handover time information and thereby establishing a connection to an access point in an ascending order of the period of time required for the handover.

15. An access point high-speed connecting method using presence service in accordance with claim 14, further comprising the step of disposing position detecting means for detecting a position of an information terminal and communicating position information of the position, wherein:

the interface support information includes the position information detected by the position detecting means; and the first information terminal having received the interface support information includes a connection destination deleting step of referring to the position information when the number of lists of the interface support information reaches a maximum registration value of lists in the data storage means and deleting interface support information of access points in an ascending order of probability of a connection thereof.

* * * * *